United States Patent

[11] 3,597,923

| [72] | Inventor | Michael Simon<br>3 Emkemdorfstrasse, 2 Hamburg-Othmarschen, Germany |
|---|---|---|
| [21] | Appl. No. | 871,028 |
| [22] | Filed | Oct. 2, 1969<br>Division of Ser. No. 704,480, Feb. 9, 1965, abandoned. |
| [45] | Patented | Aug. 10, 1971 |
| [32] | Priority | Feb. 11, 1967 |
| [33] | | Germany |
| [31] | | M 72 735 Ia/46g |

[54] ROCKET PROPULSION SYSTEM
1 Claim, 10 Drawing Figs.

[52] U.S. Cl. .................................................. 60/260,
 60/39.14, 60/39.66, 60/39.71, 60/267
[51] Int. Cl. .................................................. F02k 9/02,
 F02k 11/02
[50] Field of Search .......................................... 60/39.71,
 260, 39.14, 39.66, 266, 267, DIG. 8, 39.06, 258

[56] References Cited
UNITED STATES PATENTS

| 2,406,926 | 9/1946 | Summerfield | 60/260 |
| 2,482,262 | 9/1949 | Goddard | 60/260 |
| 2,551,112 | 5/1951 | Goddard | 60/260 |
| 3,002,340 | 10/1961 | Landerman | 60/260 |
| 3,049,870 | 8/1962 | Chamberlain | 60/260 |
| 3,077,073 | 2/1963 | Kuhrt | 60/39.71 |
| 3,224,189 | 12/1965 | Kenny | 60/39.14 |
| 3,237,400 | 3/1966 | Kuhrt | 60/260 |
| 3,295,323 | 1/1967 | Holtzman | 60/39.71 |
| 3,321,922 | 5/1967 | Latto | 60/260 |

OTHER REFERENCES

"Centaur Tests New Pump Cycle" Aviation Week, Dec. 7, 1959. Page 30. 60/260

Primary Examiner—Douglas Hart
Attorney—Stephens, Huettig and O'Connell

ABSTRACT: For starting a rocket engine, a plurality of liquified gases are first gasified at ambient temperature and fed to the combustion chamber. Then the liquefied gases are brought into heat exchange with the walls of the combustion chamber and exhaust nozzle for being gasified before being mixed and then fed into the combustion chamber.

Patented Aug. 10, 1971

ROCKET PROPULSION SYSTEM

This application is a division of application Ser. No. 704,480; filed Feb. 9, 1968, now abandoned.

In the present state of technology, rocket propulsion systems utilizing cryogenic fuels, i.e. liquefied gases, as propellants are known.

These rocket propulsion systems are operated on a cryogenic propellant component consisting of a liquid oxidizer and a further propellant component consisting of a storable liquid fuel.

Due to the increase in performance required of rocket propulsion systems during recent years, it became desirable to use solely cryogenic fuels as the propellants.

The use of low-temperature liquefied gases, however, will present a number of problems which are demonstrated with the aid of a known rocket propulsion system as described below.

In this known propulsion system, two cryogenic propellant components, for example, liquid oxygen and liquid hydrogen are used. In this case, the liquid oxygen is supplied directly to the engine combustion chamber and in a liquid state, while the liquid hydrogen is vaporized with simultaneous cooling of the combustion chamber and enters the same in a gaseous state.

During this process, the fuel lines carrying the liquid gases from the respective fuel tanks to the combustion chamber must be kept at a very low temperature in order to maintain the liquid state of gases, which applies especially to the oxygen to be supplied to the combustion chamber direct and in a liquid state.

For cooling of the liquid gases, the respective fuel lines are insulated. Experience has shown, however, that in many cases this pipe insulation did not provide sufficient cooling, thus requiring additional use of special cooling units.

Furthermore, it was found that prior to starting this known propulsion system, part of the combustion chamber or, at least, the combustion chamber fuel system designed for the injection of the liquid propellant must additionally be precooled to the relevant temperature of the liquid.

Consequently, this propulsion system will be ready for operation only after the necessary cooling of the fuel lines and of the injection system carrying the liquid gases to the combustion chamber.

The object of this invention is to design a high-performance rocket propulsion system featuring reliable and unsophisticated ignition properties and being ready for operation in a minimum of time.

Thus, this invention relates to a rocket propulsion system operated on several liquid, preferably cryogenic propellant components, i.e. propellant components consisting of liquefied gases at low temperature, e.g. liquid oxygen and liquid hydrogen. Basically, the invention is characterized by the fact that, prior to starting of the propulsion system, two or more of the cryogenic propellant components selected for operating the system are already preheated as a function of the ambient temperature of the system and enter the combustion chamber in a gaseous state, whereby, during system operation following the starting phase, the following cold, liquid gases are prevaporized due to the heat transfer from the hot combustion chamber or the associated nozzle and are, thereafter, supplied to the combustion chamber together and in a gaseous state.

Thus, in a propulsion system according to the invention, the preparation of the mixture for ignition and combustion of the propellants in the combustion chamber, as required with direct liquid injection into the combustion chamber, may be dispensed with. The liquid gases already transformed to a gaseous state prior to starting the system, thus permit ignition to take place in a reliable and easy manner, and they ensure that a high degree of readiness and thus also a short-period pulse operation is reached to control the attitude of a guided missile equipped with a propulsion system according to the invention.

Contrary to known propulsion systems with liquid propellant supply to the combustion chamber, a propulsion system according to this invention will ensure a reliable ignition to take place without the danger of explosion of the combustion chamber, since, in the combustion chamber only gaseous fuels in their respective volumes can accumulate, which, in case of a sudden ignition, by their quantity cannot cause a destruction of the propulsion system, even under adverse conditions.

Prevaporization occurring after starting and continuing during further system operation and thus the continued supply of propellants to the combustion chamber in a gaseous state, will lead to an accelerated intensified fuel combustion providing an improved thrust.

Another essential advantage of a propulsion system according to this invention is that it may be operated alternatively on one of the following propellant supply modes: liquid/liquid, liquid/gaseous or gaseous/gaseous, whereby the gases are preheated prior to their entry into the combustion chamber either as monopropellants or additional fuel components of the liquid gases. Thus, by way of principle, the fuels will always enter the combustion chamber in a gaseous state, irrespective or the supply mode chosen.

Thus, in a propulsion system according to the invention, always the same fuel injection system designed for a gas phase is used, irrespective of the individual fuel supply mode chosen. Since the fuels will principally enter the combustion chamber in a gaseous state, the addition of an injection system specially designed for the supply of liquid fuels to a system provided for the supply of gaseous fuels, as used, for example, in a propulsion system provided with common supply of liquid and gaseous fuels to the combustion chamber, can be dispensed with.

Contrary to a conventional propulsion system with direct, liquid injection of liquid gases into the combustion chamber, the sophisticated insulation requirements for the pipes carrying the liquid gases from the fuel tanks to the combustion chamber is rendered superfluous in a system according to this invention, which is advantageous, since, in such a system, the liquid gases in the fuel supply lines will be heated up and transformed into a gaseous state already prior to starting the propulsion system.

Furthermore, in a propulsion system according to this invention, any additional cooling processes, which in case of liquid injection are required for cooling an injection system designed for liquid injection, can be omitted.

Another essential advantage of a propulsion system according to this invention over conventional propulsion systems using direct liquid fuel injection into the combustion chamber is the fact that it can readily be restarted even under zero $g$ conditions.

Under zero $g$ conditions, there is no distinct separation between the gaseous and liquid portions of cryogenic fuels in the tank systems, so that, with a conventional propulsion system, a continued liquid fuel injection and thus a safe restart are not ensured under such conditions. Also, for this reason, the basic feature of this invention, i.e. to transform fuels prior to their entry into the combustion chamber into a gaseous state, presents an essential improvement over the known rocket propulsion systems already mentioned.

In addition, it should be noted that, contrary to liquid fuel injection, the supply of fuels in a gaseous state into the combustion chamber of a rocket propulsion system according to this invention will lead to a linear function between fuel flow and injection backing pressure. Thus the injection pressure gradient will remain constant while, with liquid injection into the combustion chamber, the injection pressure gradient will be subject to changes of approximately the second power. Thus, with liquid injection, low thrusts are limited by insufficient injection velocity combined with insufficient mixing and tendency to vibration; and, furthermore, high thrusts are limited by excessive injection pressures. Contrary thereto, with the supply of the fuels to the combustion chamber in a gaseous state, the injection velocity will remain constant, and it is only the injection pressure which will change in proportion to the altered thrust level. In this manner, in a propulsion system according to this invention, the variable thrust range with fixed cross-sectional areas of the injection devices will be increased from approximately 1:5 to approximately 1:100.

According to a further feature of this invention, the fuels evaporating from the tank systems associated with the propulsion system and/or residual fuel quantities may be used for thrust generation. This may be accomplished with the aid of additional pipes, one end of which terminating in the upper region of a fuel tank, while the other end is connected to the main fuel line leading from each tank to the combustion chamber, with valves being installed in the evaporation line of each tank as well as in the main fuel line associated with each tank, i.e. between the tank and the connection point of the evaporation line to the main fuel line.

In this manner, it will be possible, for example, to compensate for undesirable evaporation losses of a propulsion system according to this invention that occur under zero g conditions, while, otherwise, i.e. on propulsion systems equipped with direct liquid fuel injection, fuel residues and/or evaporating fuel will have to be blown off without any effect.

During the zero g phase, a propulsion system according to the invention may be operated and ignited with the aid of the additional fuel lines. With developing acceleration, a thrust distribution, including hot gas ignition, cold gas thrust buildup, short-period mixed phase operation and, finally, pure cold gas operation on the fuel now evaporating from the liquid in the tanks, is obtained. The further thrust development will correspond to the pressure prevailing in the tank and to its drop. This process may be stopped and repeated as desired. If the propulsion system is subsequently required to carry out a main propulsion phase, the additional shutoff valves in the main fuel lines will open, while the valves in the additional lines carrying the evaporating fuels will be closed or, as nonreturn check valves, will close automatically as soon as, due to the developing preacceleration, the pressure at the base of the tank will rise owing to the corresponding level of the liquid. Thereafter, the propulsion system will then operate solely on liquid supply. Then, towards the end of the final main propulsion phase, it will be possible to completely use up the liquid fuels until the pressure gases will start flowing, which is made possible by the insensibility against changing phases of the fuels supplied to the propulsion system. Thus, with cryogenic propellant combinations, the fuels themselves may advantageously be used for generating pressure gas so that, without a transition period, an operation on liquid fuel residues may be followed by a thrust phase utilizing the pressure gases. The pressure gases may be used until the minimum permissible combustion chamber pressure is reached.

The means by which the objects of this invention are obtained are described more fully with reference to the accompanying drawings, in which.

In the following description of the individual embodiments, the majority of identical parts have the same reference numeral.

Figure 1:
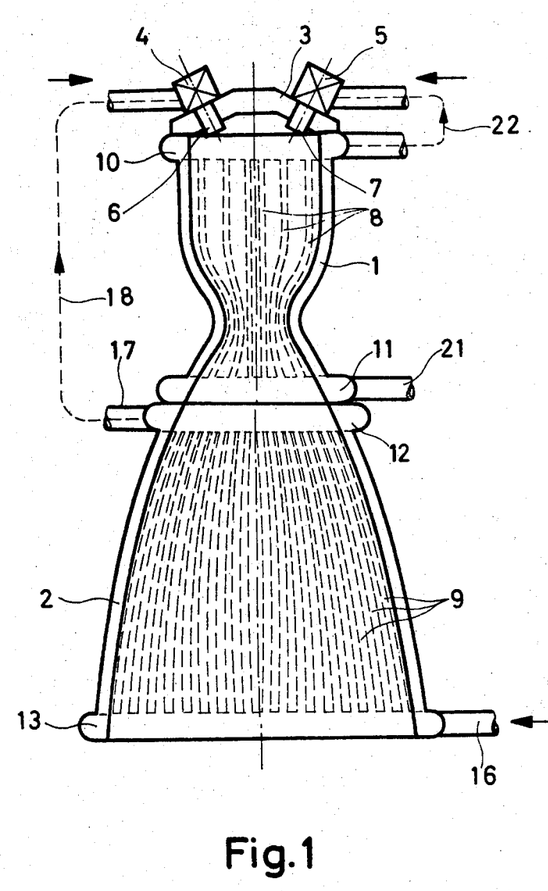
FIG. 1 is a longitudinal cross-sectional view of the combustion chamber and its associated nozzle of a propulsion system according to this invention.

In FIG. 1, the combustion chamber 1 is joined to nozzle 2, combustion chamber and nozzle being connected to form an integral propulsion unit. At its upper end, combustion chamber 1 is closed by its associated injection head 3. Control valves 4 and 5 are rigidly connected to injection head 3. Injection nozzles 6 and 7 are located in injection head 3. Cooling passages 8, extending essentially in an axial direction, are arranged in the walls of combustion chamber 1 and distributed over its whole circumference; the same applies to the associated nozzle 2 and passages 9. The upper and lower ends of the combustion chamber are surrounded by hollow annular flanges 10 and 11, arranged coaxially to combustion chamber 1 and communicating with the respective upper and lower ends of the cooling passages 8. Likewise, the associated nozzle 2 features two hollow annular flanges 12 and 13, arranged coaxially at its ends, which communicate with the upper and lower ends, respectively, of cooling lines 9 in a suitable arrangement. The propulsion system is operated, for example, on the cryogenic fuel components fluorine and hydrogen. Thus, for example, liquid fluorine as an oxidizer, is fed from fuel tank 14 (FIG. 2) through fuel supply line 15 and via connectors 16 (FIG. 1) into the annular flange 13 of nozzle 2 and from there into the associated cooling passages 9. The heat transferred from nozzle 2 effects evaporation of the liquid fluorine inside the cooling lines 9 and its transformation into a gaseous state. Thereafter, the gaseous fluorine enters fuel line 18, shown in a dashed line, via the annular hollow flange 12 on the upper end of nozzle 2 and connectors 17 attached to annular flange 12. From fuel line 18 it is routed to combustion chamber 1 via the associated control valve 4 and injection nozzle 6.

Figure 2:
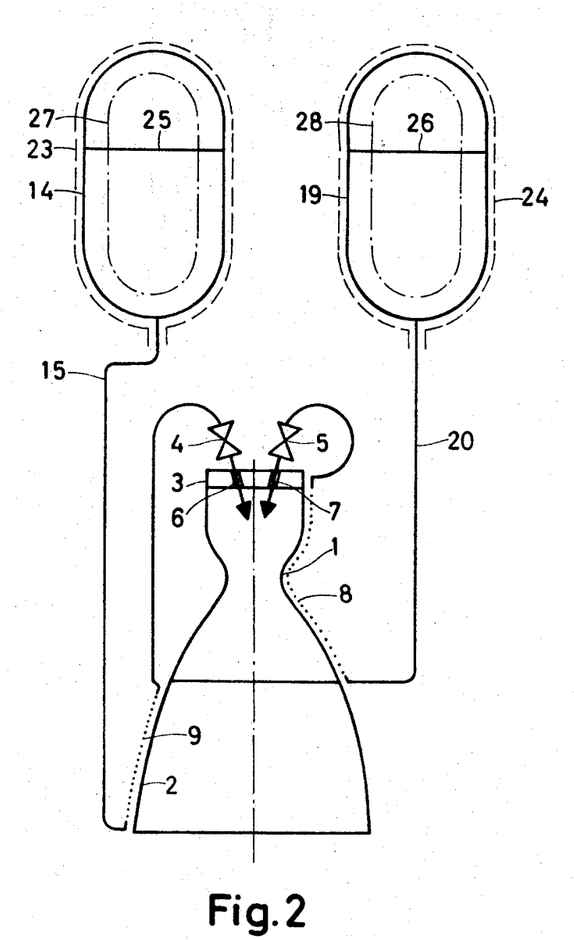
FIG. 2 is a similar view of a first embodiment of this invention.

From tank 19, FIG. 2, another propellant component (in this case, e.g. liquid hydrogen) is fed via the associated fuel line 20 and connector 21, FIG. 1, to the annular hollow flange 11 located at the lower end of combustion chamber 1 and from there to cooling passages 8 within the walls of combustion chamber 1. In cooling passages 8, the liquid hydrogen evaporates and enters, transformed into a gaseous state, another fuel line 22, shown in chain dotted lines, via the annular flange 10 at the upper end of combustion chamber 1, thereafter flowing to control valve 5. From there the gaseous hydrogen is introduced into combustion chamber 1 via the associated injection nozzle arranged in injection head 3. Thus, during engine operation, the fuels are always transformed into gaseous state prior to entering the combustion chamber for combustion. Valves 4 and 5 are suitably arranged downstream of the associated cooling passages 8 and 9, thus being pure gas control valves featuring a considerably less sophisticated design as compared to corresponding fuel control valves which would be required for supplying liquid fuels to the combustion chamber, since the design of the latter would also have to consider cavitation and volume changes due to temperature effects occurring with liquids.

In FIG. 2, the insulations 23 and 24 of fuel tanks 14 and 19 are shown in dashed lines. These insulations 23 and 24 have the task of keeping the fuels contained in tanks 14 and 19 at very low temperatures.

Contrary to conventional propulsion systems with liquid fuel injection into the combustion chamber, fuel lines 15 and 20, feeding the fuels from tanks 14 and 19 into combustion chamber 1, have no insulation. Thus it is ensured that the liquid gases in lines 15 and 20 are heated up already prior to starting the propulsion system and they can, therefore, be introduced into the combustion chamber in a gaseous state, thus enabling easy and reliable ignition of the propulsion system which is immediately ready for operation.

For convenience, FIG. 2 shows fuel lines 15 and 20 only along one side of nozzle 2 and combustion chamber 1, respectively, as dotted lines. In FIG. 2 as well as in the embodiments following thereafter, the fuel level in tanks 14 and 19, after preacceleration, is indexed to levels 25 and 26, respectively.

The dot-dash contour lines 27 and 28 in the tanks 14 and 19 mark the excess pressure encountered during the zero g phase.

Figure 3:
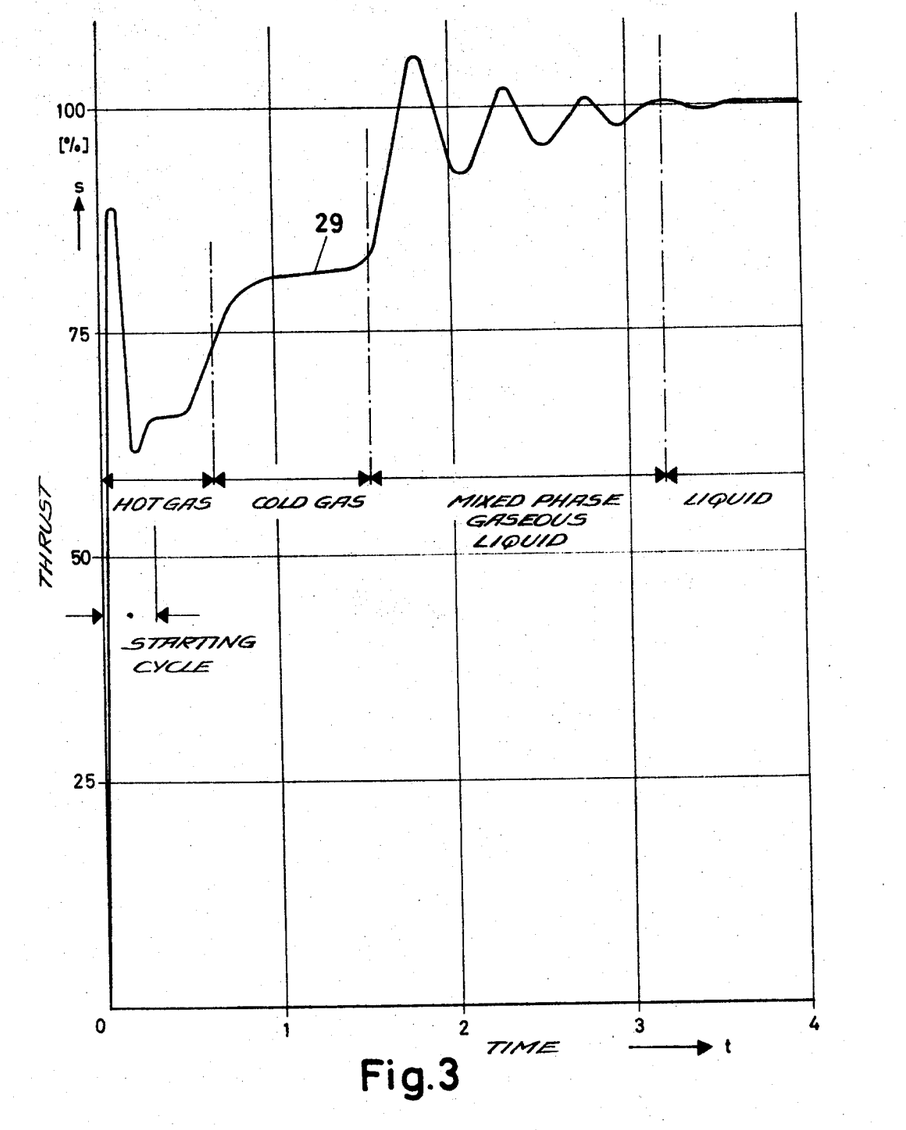
FIG. 3 is a graph representing the qualitative thrust/time distribution of the propulsion system of FIG. 2.

FIG. 3 is a graphic presentation of the qualitative thrust/time distribution for a start under zero g conditions, the engine being operated on two cryogenic propellant components according to FIG. 2. The thrust rating s, 80 to 100 percent, is plotted on the ordinate, while the abscissa shows the time unit t from 0 to 4, in which connection, however, the time scale has a qualitative meaning only. The individual phases of the fuel supply to be passed during a start under zero g conditions may be seen from the graphical presentation. Basically, they consist of the "hot gas operation" including ignition and a short-period operation with relatively hot fuel gases from the cooling passages and pipes, the subsequent operation with cold gases starting to flow thereafter, called "cold gas operation," the subsequent mixed phase operation, referred to as "mixed phase, gaseous/liquid," and after a sufficient acceleration period, the operation on purely liquid fuel supply, designated "liquid."

From curve 29 giving an approximate presentation of the thrust performance as a function of the individual operating phases during a start under zero g conditions, it may be seen that the thrust level of possibly successive impulses may vary, since, depending on the impulse period, frequency and ignition timing, relatively hot gases (at approximately room temperature), cold gases (at approximately saturated steam temperature) or liquids will have to be utilized.

Therefore, it will be possible to operate a propulsion system according to the invention in a pulsating or impulse operation mode, if it is possible to compensate the thrust differences by means of the impulse duration (impulse relative to time).

Figure 4:
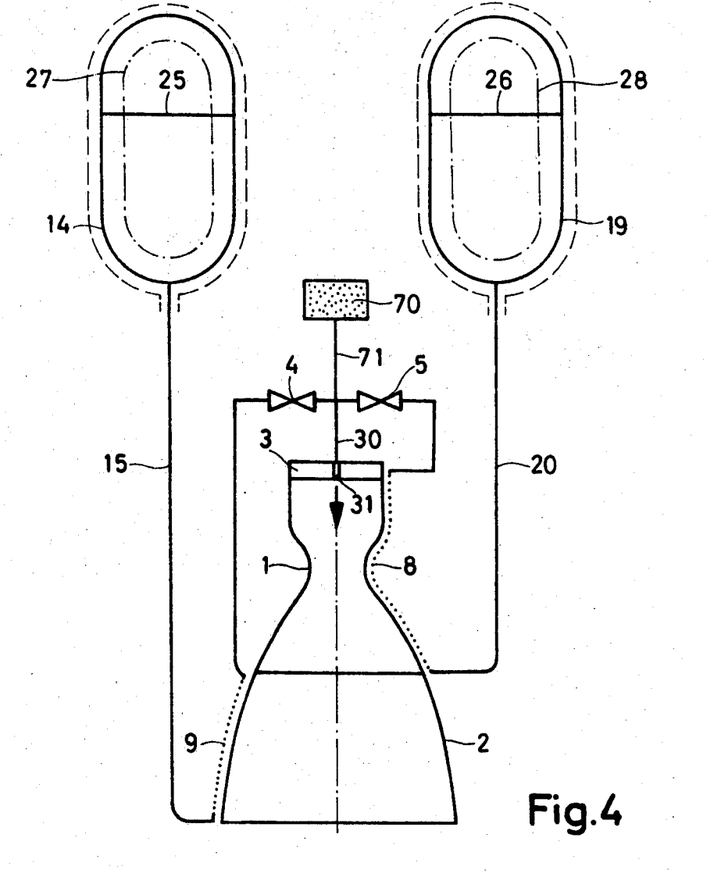
FIG. 4 is a view similar to FIG. 1 but showing a second embodiment.

FIG. 4 illustrates another embodiment of a rocket propulsion system according to the invention deviating from the embodiment of an engine according to FIG. 2 in that the cryogenic propellants transformed into a gaseous state have been premixed prior to their entry into the combustion chamber, whereby metal powder additives are to be mixed into the fuels during or prior to the premixing process.

Prior to starting the propulsion system, i.e. already when passing through pipes 15 and 20, the fuels are preheated by the ambient temperature of the propulsion system and thus transformed to a gaseous state. Thereafter, they are routed via cooling passages 8, 9 into control valves 4 and 5 and from there, under simultaneous thorough mixing, into a common pipe 30 leading to injection head 3 of combustion chamber 1 and, finally, through a common injection orifice 31 in the injection head 3 into combustion chamber 1. The metal powder additives are fed from a separate container 70 via an attached line 71 terminating in the common fuel mixing line 30 and are then, well mixed with the fuels, introduced into the combustion chamber.

In the same manner as described above, during engine operation also the gases evaporated and transformed to a gaseous state due to the heat transfer from combustion chamber 1 and nozzle 2 are premixed prior to their entry into the combustion chamber and then introduced into same together with the metal powder additives. By means of premixing of the gases under simultaneous addition of the metal additives it is possible to increase the combustion efficiency to approximately 100 percent, thus achieving a considerable improvement in performance.

Figure 5:
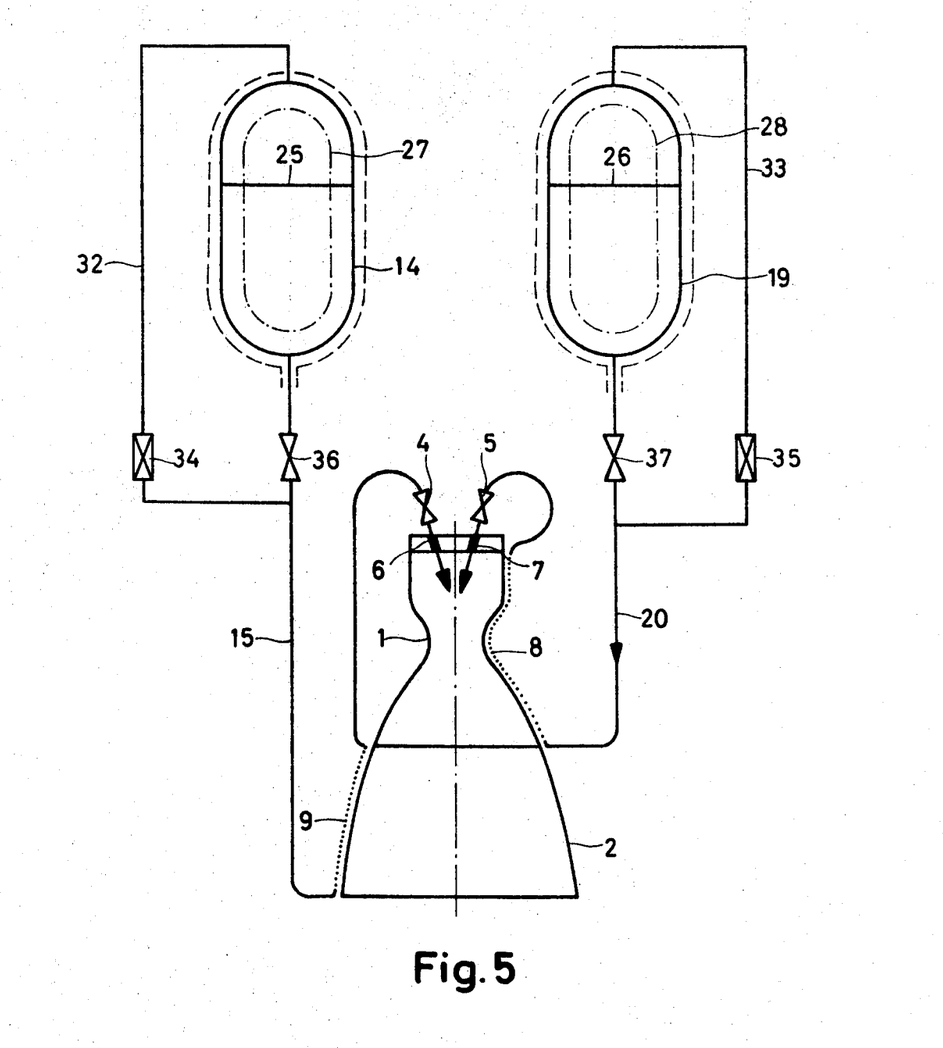
FIG. 5 is a similar view showing a third embodiment.

The embodiment of a propulsion system according to the invention, as shown in FIG. 5, deviates from the systems illustrated in FIGS. 2 and 4 in that it features a device which enables utilization of the fuels evaporating from fuel tanks 14 and 19 or of residual fuels for thrust generation. For this purpose, additional fuel lines 32, 33 have been provided, each terminating with one of its ends in the upper end of a fuel tank 14, 19 and with its other end in the respective main fuel supply lines 15, 20 associated with each tank 14, 19. In fuel lines 32, 33 cutoff valves 34, 35 are arranged. Valves 36, 37, which may also be closed or opened as desired, are provided in main fuel supply lines 15 and 20. They are arranged in those sections of lines 15 and 20 which run between the associated tanks 14, 19 and the relevant connection points of auxiliary lines 32 and 33 to the main fuel supply lines 15, 20.

Figure 6:
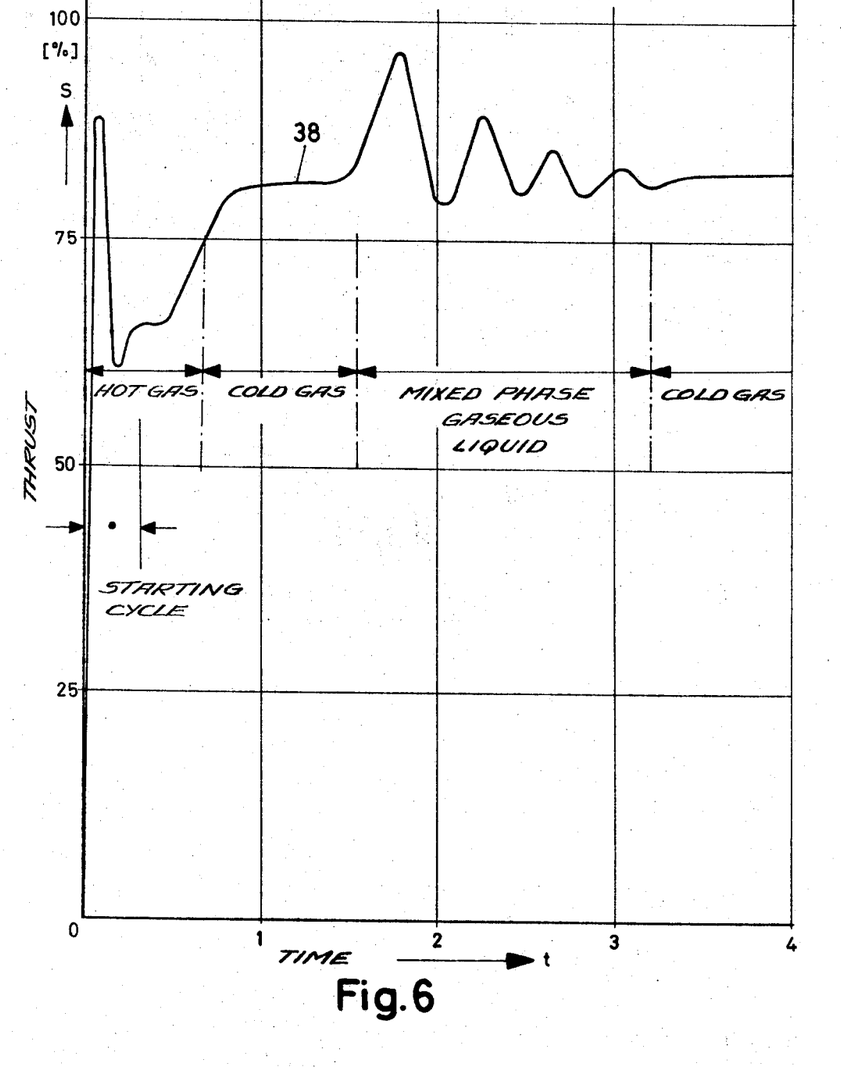
FIG. 6 is another graph representing the qualitative thrust/time distribution during the starting phase of the propulsion system of FIG. 5, wherein the system is started by means of evaporating fuels.

In the following, the case of a zero g phase, in which undesirable, excessive evaporation losses occur, is dealt with for the function of a propulsion system according to FIG. 5. In order to be able to analyze the thrust distribution as a function of time as well as of the individual operating conditions during a start under zero g conditions, the further description of a function of a propulsion system to FIG. 5 shall also include FIG. 6. During and after the zero g phase, respectively, the propulsion system is operated with the aid of the additional pipe lines 32, 33. During the developing acceleration, a thrust distribution according to curve 38 in FIG. 6 is obtained, featuring hot gas ignition, cold gas thrust buildup, short-period mixed phase operation and, finally, pure cold gas operation on fuels now evaporating from tanks 14, 19. The further thrust distribution thereafter will correspond to the prevailing tank pressure and its respective drop. This process may be stopped and repeated as desired. If the propulsion system in FIG. 5 is subsequently required to carry out a main propulsion phase, the additional shutoff valves 36, 37 in the main fuel lines 15, 20 will open, while the valves in the additional lines 32, 33 carrying evaporating fuels will be closed or, as check valves, will close automatically as soon as, due to the developing preacceleration, the pressure at the bottom base of the tank will rise owing to the corresponding level of the liquid. The propulsion system will then operate solely on liquid supply. Then, towards the end of the final main propulsion phase, it will be possible to completely use up the liquid fuels until the pressure gases start to flow, which is made possible by the insensibility against changing phases of the fuels supplied to the propulsion system. Thus, with cryogenic fuel combinations, the fuels themselves may advantageously be used for generating pressure gas so that, without a transition period, an operation on liquid fuel residues may be followed by a thrust phase utilizing the pressure gases. The pressure gases may be used until the minimum permissible combustion chamber pressure is reached. Due to the required injection accuracy upon propellant cutoff after the final main propulsion phase, the wide variable thrust range is used to run the last propulsion phase at a considerably reduced thrust level, so that then the smallest thrust variations during a phase change and a smaller thrust decrease with dropping tank pressure will be obtained.

In propulsion system according to FIG. 5, preheating and thus simultaneous transformation of liquid fuels into gases prior to starting the propulsion system is effected by means of fuel lines 15 and 20 due to their preheating to ambient temperature, as was the case with the embodiments described above. The evaporation developing after launch and during propulsion system operation and thus the transformation of the liquid gases into a gaseous state due to the heat radiating from combustion chamber 1 and nozzle 2 has been simplified also in FIG. 5, where a dotted portion of fuel line 15 along nozzle 2 and of line 20 along its associated combustion chamber are given. Also, to this embodiment, the details of combustion chamber and nozzle as in an embodiment to FIG. 1 will apply.

Figure 7:
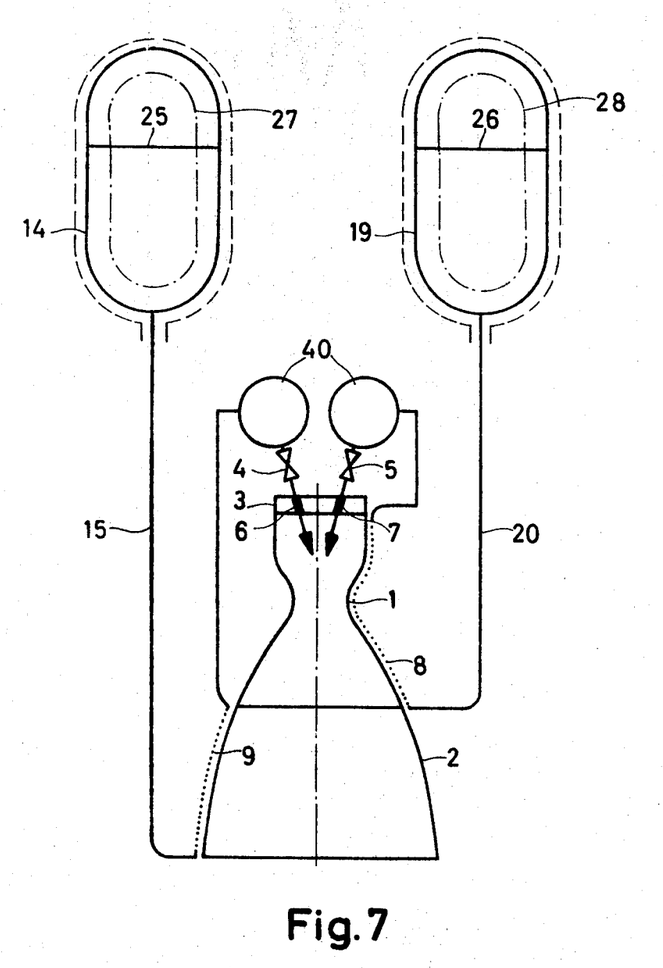
FIG. 7 is a view similar to FIG. 1 showing a fourth embodiment.
Figure 8:
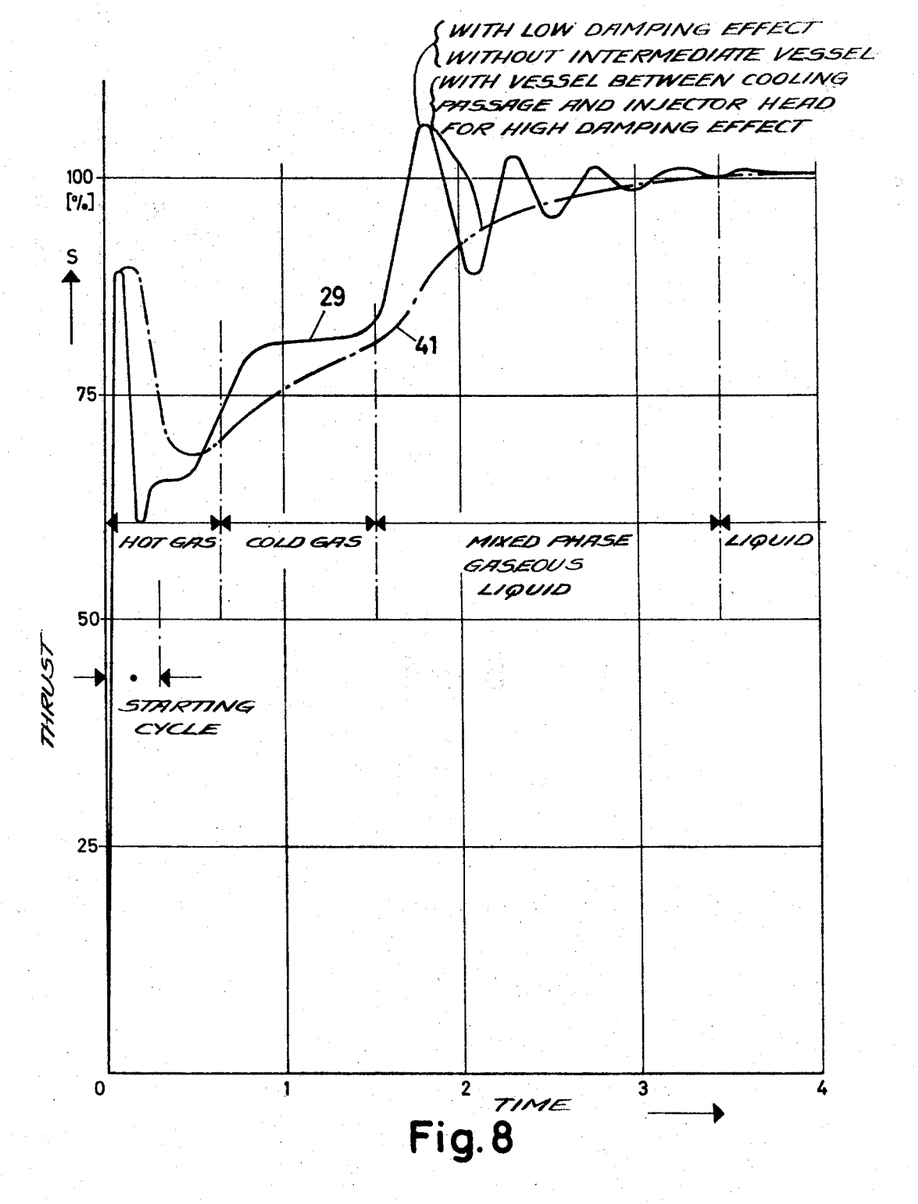
FIG. 8 is a further graph corresponding to FIG. 3 with an additional thrust curve deviating from FIG. 3, caused by the embodiment of a propulsion system to FIG. 7.

FIG. 7 deviates from the embodiment of a propulsion system according to FIG. 2 in that, for damping the pressure and temperature variations of the fuels supplied to the combustion chamber and thus for reducing the thrust variations, intermediate tanks 40 are arranged in fuel lines 15, 20 leading from fuel tanks 14, 19 to combustion chamber 1. The intermediate tanks 40 are arranged downstream of cooling passages 8 and 9 of combustion chamber 1 and nozzle 2 and are located above the injection head 3. From intermediate tanks 40, the gaseous fuels flow into control valves 4 and 5 and from there into combustion chamber 1 via injection nozzles 6 and 7 which are part of injection head 3. The volumes of the intermediate tanks 40 are matched to the volumes of the combustion chamber and the pipes as well as to the respective flow coefficients. The principle of operation of the intermediate tanks 40 is demonstrated clearly in the following FIG. 8, where the qualitative thrust/time distribution for an engine to FIG. 7, operated on two liquid fuel components is shown. Basically, the graph in FIG. 8 corresponds to that given in FIG. 3, also featuring the four basic operating phases during a launch cycle, such as "hot gas," "cold gas," "mixed phase," "gaseous/liquid" and "liquid." The thrust level resulting as a function of these operating phases may be seen from curve 29, shown full in black, which corresponds to curve 29 in FIG. 3. This curve is obtained with a conventional fuel line system without the use of intermediate tanks 40 to FIG. 7. There is a distinctive rise of curve 29 after ignition, while, normally, the maximum ignition peak need not reach the design thrust value. The drop of curve 29 following the ignition peak is caused by the developing effect of the regenerative cooling of combustion chamber 1 and nozzle 2, the design details of which may be identical to the example shown in FIG. 1, and by the relevant additional heating of the hot fuel gases supplied to the propulsion system. As soon as the fuel line system has been cooled down, and when, from tanks 14, 19, both fuel gases and liquids are flowing to the propulsion system, then the "mixed phase" with thrust variations, caused by intermittent gas/liquid fuel supply, will begin. The following "liquid phase" will initiate a further thrust increase up to the design point. The effect of intermediate tanks 40, FIG. 7, on the thrust level during the launching phase is shown by means of the dot-dash curve 41 in FIG. 8. From the thrust distribution according to curve 41, it may be seen that it will be possible to sufficiently suppress the thrust variations through intensive damping by means of intermediate tanks 40.

Figure 9:
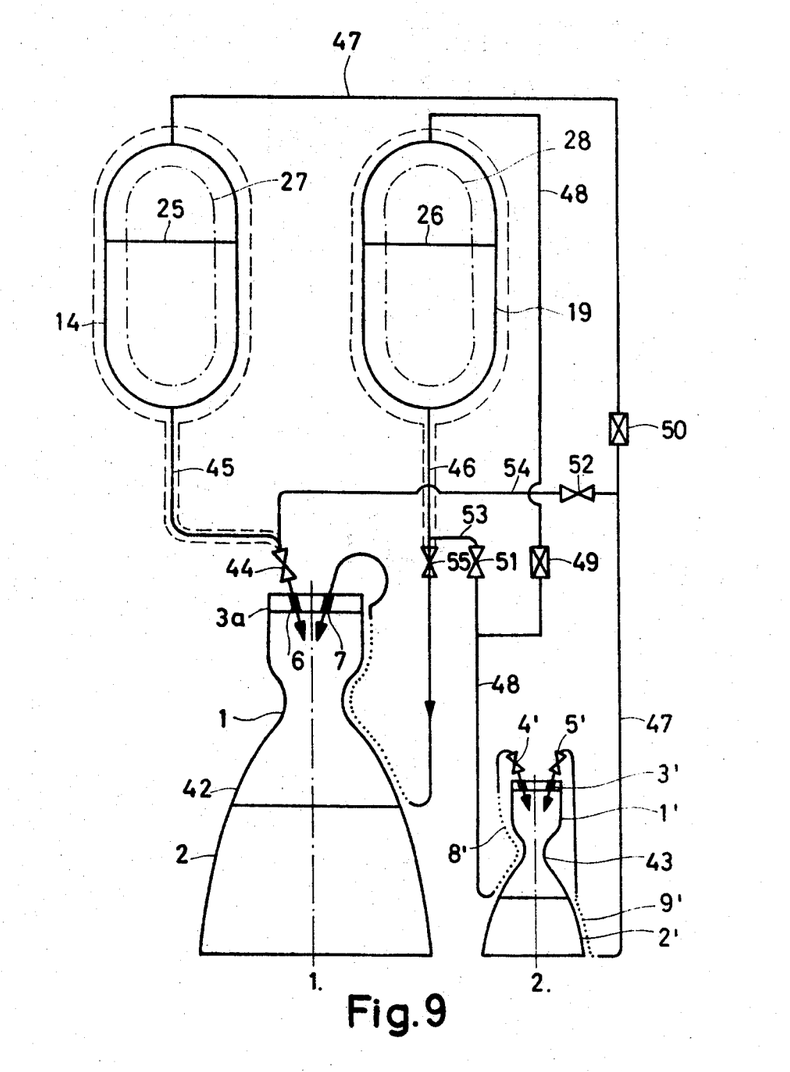
FIG. 9 is a view similar to FIG. 1 showing a fifth embodiment.

FIG. 9 shows an embodiment of a rocket propulsion system according to the invention which is operated on two cryogenic propellant components and features a main propulsion system 42 and a auxiliary propulsion system 43. The two propellant components from the associated tanks 14 and 19 serve the purpose of a common fuel supply to propulsion systems 42 and 43. It will, however, also be possible to shut down one of the two propulsion systems, e.g. 42, and to operate only propulsion system 43 on fuels from tanks 14 and 19.

In this case, the main propulsion system 42 will, for example, be of a conventional design and its associated combustion chamber 1 be supplied with a liquid cryogenic propellant component from fuel tank 14 via fuel line 45 which is routed to the liquid fuel control valve 44 and insulated for cooling purposes. Another liquid, cryogenic fuel component is, prior to being introduced into combustion chamber 1, transformed into a gaseous state by routing the associated fuel supply line 46 along combustion chamber 1.

In a rocket propulsion system according to FIG. 9, it will be possible, for example, to shut down the main propulsion system 42 under zero $g$ conditions, when the pressure in fuel tanks 14 and 19 increases under such conditions, and to operate the auxiliary propulsion system by means of the fuels evaporating from fuel tanks 14 and 19. One end of each of fuel lines 47 and 48 carrying the evaporating fuels to the auxiliary propulsion system terminates in the top part of the associated fuel tanks 14 and 19, while their other ends terminate in the associated evaporation passages 8' and 9' of combustion chamber 1' and nozzle 2'. There, the gaseous fuels are further heated up and, after transformation to a gaseous state, flow via control valves 4' and nozzle 5' and injection head 3' into combustion chamber 1'.

Preferably, auxiliary propulsion system 43 is operated until the desired tank pressure drop for compensation of the evaporation losses is reached, and valves 49 and 50, arranged in the supply lines 47 and 48 of auxiliary propulsion system 43 will shut off the connection between tanks 14 and 19 and combustion chamber 1 on the evaporation side prior to reengagement of the main propulsion system 43, and while further valves 51 and 52 in fuel lines 53 and 54 (enabling fuel supply to auxiliary propulsion system 43 from the bottom bases of tanks 14 and 19) remain opened until the desired preacceleration is obtained with the aid of auxiliary propulsion system 43. Thereupon, further valves 44 and 55 in lines 45 and 46 will open and enable the main propulsion system 42 to be started. In this connection, it is worth mentioning that, preferably, the design value of the thrust level of auxiliary propulsion system 43 may be so high as to suffice for preacceleration and utilization of the evaporated fuel quantities.

Figure 10:
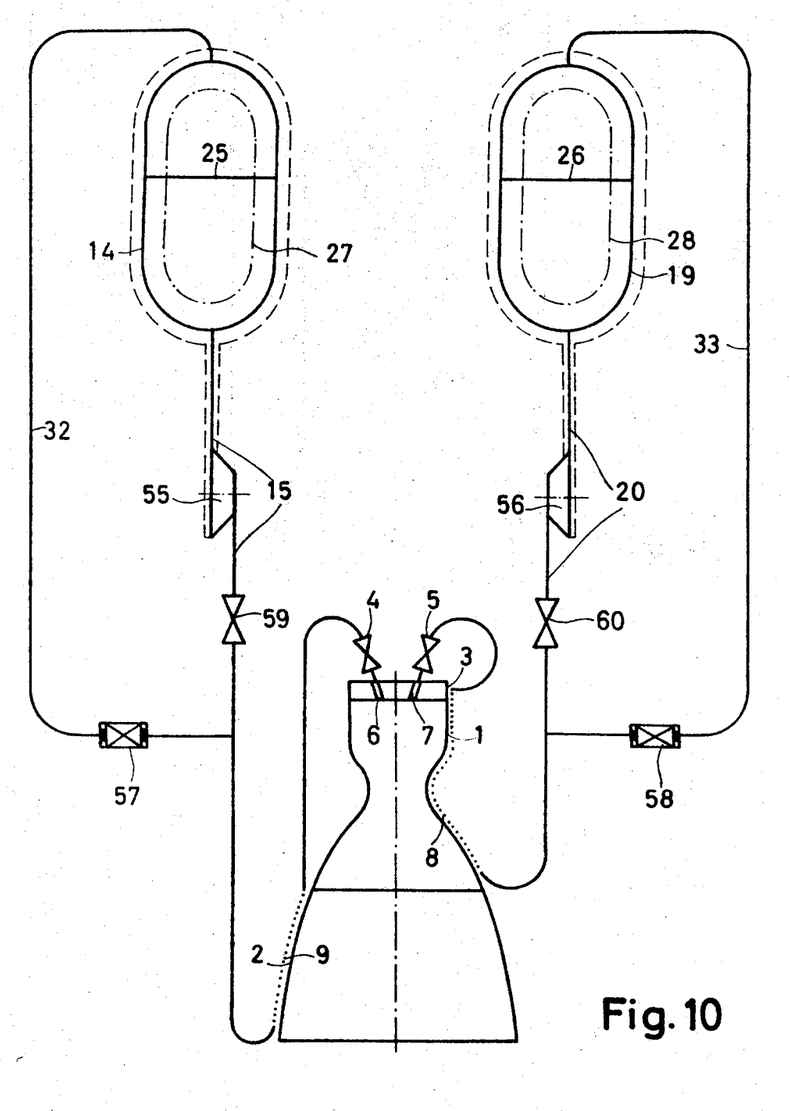
FIG. 10 is a similar view showing a sixth embodiment.

FIG. 10 shows another embodiment of a propulsion system according to the invention, deviating from the embodiment in FIG. 5 mainly by the fact that, for obtaining a high thrust, turbine pumps 55 and 56 are provided in main fuel lines 15 and 20, these pumps being so arranged as to permit optional connection to the circuit to intensify fuel supply from tanks 14 and 19 to combustion chamber 1.

In the following, for example, the function of the propulsion system, as shown in FIG. 10, under zero $g$ conditions and the heat supply under these conditions is explained. For generating an auxiliary thrust, the fuels evaporating, in this case, due to the excess pressure in fuel tanks 14 and 19 are fed to combustion chamber 1 via auxiliary lines 32 and 33, which is continued until the supply of pure cold gas is reached after preacceleration of the propulsion system and, combined with it, the pressure drop in fuel tanks 14 and 19 after completed preacceleration has been indexed to levels 25 and 26, while the dot-dash lines 27 and 28 mark the excess pressure in fuel tanks 14 and 19 during zero $g$ conditions. Following the drop of the tank pressure, the cold gases are further cooled down by means of an auxiliary pressure gas supplied from another source, causing another increase of the pressure in tanks 14 and 19, whereupon valves 57 and 58, arranged in auxiliary lines 32 and 33, are closed, while, at the same time, valves 59 and 60 located in main fuel lines 15 and 20 open, and the combustion chamber is supplied with fuel in a purely liquid state for generating the main thrust, said fuel (in order to generate a high thrust) being delivered under adequately high pressure with the aid of turbine pumps 55 and 56 arranged in main fuel lines 15 and 20.

In analogy to the embodiment in FIG. 5, also in the engine according to FIG. 10 the fuels are preheated prior to launching by omission of the pipe insulations of those sections of fuel lines 15 and 20 located downstream of turbine pumps 55 and 56, whereby cold, liquefied gases starting to flow after the start and during system operation are evaporated by routing them along the combustion chamber and nozzle walls by means of cooling passages 8 and 9 and, thereupon, after being transformed into a gaseous state, are introduced together into combustion chamber 1 via control valves 4 and 5 and injection nozzles 6 and 7 of injector head 3.

Combustion chamber 1 and its associated nozzle may be designed according to the embodiment shown in FIG. 1. However, it will also be possible to form the walls of combustion chamber and nozzle by using cooling passages 8 and 9, respectively, proper, in which case, these cooling lines, arranged closely together in an axial or radial direction, will follow the desired shape of combustion chamber and nozzle. Due to the fact that the cooling passages are designed to form also the walls of combustion chamber and nozzle, a considerable increase in the efficiency of cooling and vaporizing, respectively, is achieved.

Having now described the means by which the objects of the invention are obtained.

I claim:

1. A rocket propulsion system using a plurality of liquid cryogenic propellant components composed of low-temperature liquefied fuel gases comprising a first combustion chamber, an exhaust nozzle joined to said combustion chamber, and means for initially supplying said propellant components in a gaseous state at ambient temperature to said chamber prior to launching said system, means comprising fuel tanks containing said liquefied propellant components and pipe means including outlet pipes extending between the fuel tanks and the upstream and downstream ends of said chamber and exhaust nozzle for bringing said gases into heat exchange relation with the walls of said chamber and nozzle for heating the gases and cooling the walls, comprising individual cooling passages extending axially in heat exchange relation with said walls while simultaneously forming said walls and communicating with said pipe means, said pipe means further comprising additional fuel pipes extending between the outlet pipes from said fuel tanks and the upper parts of said fuel tanks, and valve means (34, 35, 36, 37) in said additional fuel pipes and said outlet pipes for feeding gaseous fuel into said cooling passages for making additional thrust generation (FIG. 5).